United States Patent [19]

Miyamoto et al.

[11] Patent Number: 5,252,051

[45] Date of Patent: Oct. 12, 1993

[54] RESIN-SEAL APPARATUS FOR SEMICONDUCTOR ELEMENT

[75] Inventors: Mitsugu Miyamoto; Minoru Togashi, both of Chigasaki; Fumio Takahashi, Yokohama; Yutaka Fukuoka, Tokyo, all of Japan

[73] Assignee: Kabushiki Kaisha Toshiba, Kawasaki, Japan

[21] Appl. No.: 735,888

[22] Filed: Jul. 25, 1991

[30] Foreign Application Priority Data

Jul. 27, 1990 [JP] Japan .................. 2-200454

[51] Int. Cl.⁵ .................. B29C 45/02; B29C 45/14; B29C 45/40; B29C 45/73
[52] U.S. Cl. .................. 425/116; 249/68; 264/272.170; 425/121; 425/444; 425/556; 425/547
[58] Field of Search ............ 425/116, 117, 127, 129.1, 425/406, 411, 408, 543, 547, 548, 422, 444, DIG. 13, DIG. 228, 121, 544, 556; 249/78, 79, 67, 68, 95, 80, 81; 264/272.17

[56] References Cited

U.S. PATENT DOCUMENTS

| | | | |
|---|---|---|---|
| 1,948,989 | 2/1934 | McEwan | 249/80 |
| 4,615,857 | 10/1986 | Baird | 425/116 |
| 4,632,653 | 12/1986 | Plocher | 425/117 |
| 4,897,030 | 1/1990 | Vajtay | 425/DIG. 13 |
| 5,059,105 | 10/1991 | Baird | 425/411 |
| 5,073,099 | 12/1991 | Kayano | 425/411 |

*Primary Examiner*—Khanh P. Nguyen
*Attorney, Agent, or Firm*—Finnegan, Henderson, Farabow, Garrett & Dunner

[57] ABSTRACT

According to this invention, there is disclosed a resin-seal apparatus for a semiconductor element, including cavity blocks arranged to be opposite to each other and having a semiconductor element to be molded, ejector plates arranged to correspond to the cavity blocks, respectively, ejector pins and support pins arranged between the ejector plates and the cavity blocks, a pair of first annular heat-plate molding die sets arranged to surround the ejector plates arranged to correspond to the cavity blocks, a second heat-plate molding die set arranged below a corresponding one of the ejector plates, a plate holder below the second heat-plate molding die set, a gap portion and an elastic member formed between the plate holder and the second heat-plate molding die set, vertically movable connecting rods arranged through the gap portion and each having one end connected to a side surface of the corresponding one of the ejector plates, a stepped bolt engaged with the other end of each of the connecting rods, and push-up rods for pushing up the stepped bolts.

6 Claims, 4 Drawing Sheets

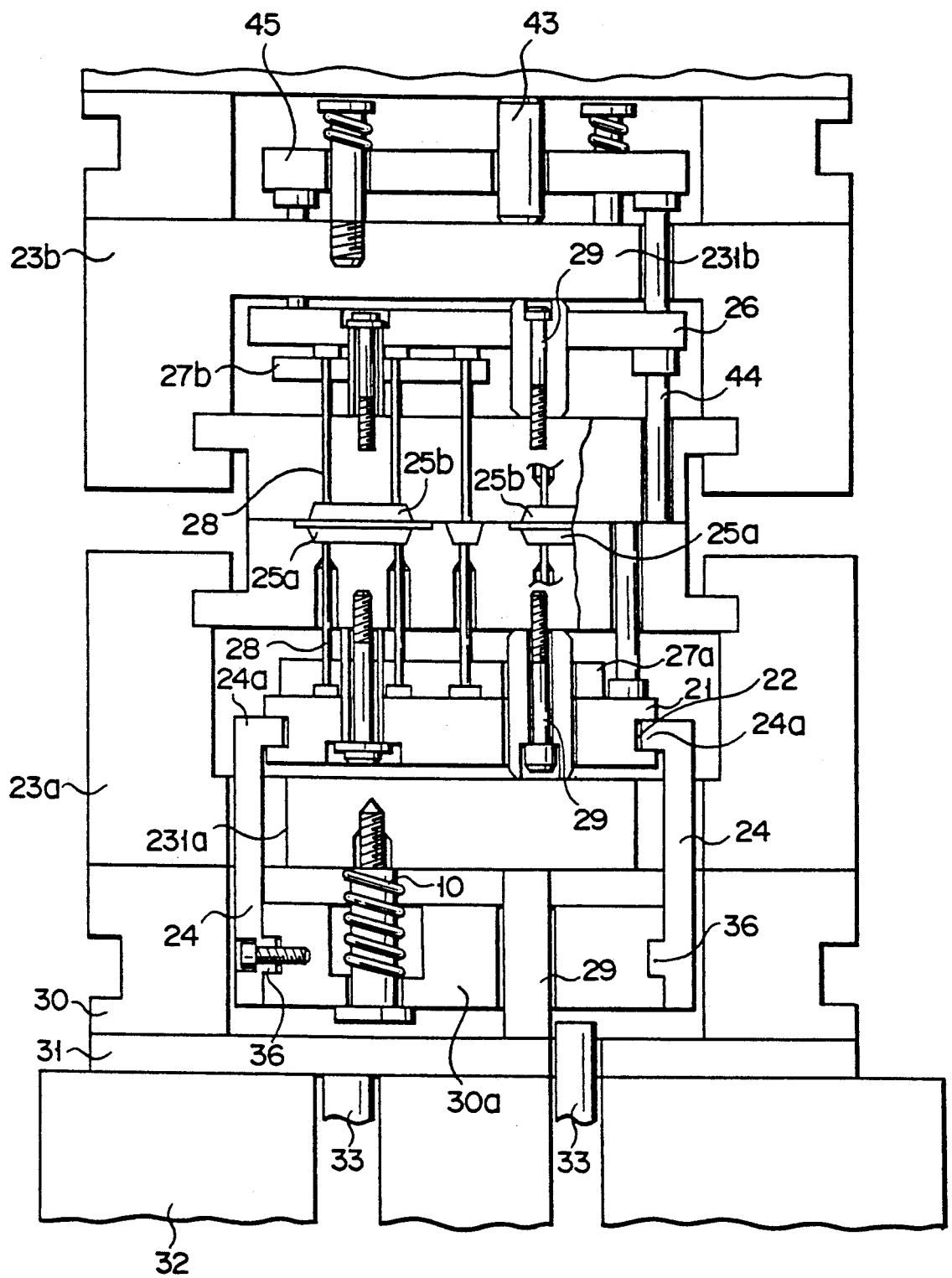
F I G. 2

RESIN-SEAL APPARATUS FOR SEMICONDUCTOR ELEMENT

BACKGROUND OF THE INVENTION

1. Field of the Invention

The present invention relates to a resin-seal apparatus for a semiconductor element and, more particularly, to a resin-seal apparatus for a semiconductor element capable of improving productivity of a resin-sealing step for a semiconductor element.

2. Description of the Related Art

It is well-known that a resin-sealing step is performed by a transfer molding method to protect a semiconductor element from an external atmosphere. An apparatus for a special purpose is utilized in the resin-sealing step. In this apparatus, a pre-melted tablet-like sealing resin is used.

The above apparatus has a chase molding die set in accordance with a change in recent production methods for a semiconductor element from production for a small number of types of semiconductor elements to production for a large number of types of semiconductor elements.

In the above apparatus, a pot is heated by a heat-plate molding die set (to be described later) to melt the tablet-like sealing resin, and the sealing resin flows through a cull, a runner, a gate, and a cavity. After semiconductor elements to be molded which are coated with the sealing resin, a resin-sealing step is completed, and the resin-sealed semiconductor elements are released from the cavity formed by cavity blocks, thereby completing the entire steps. A resin-seal apparatus having the cavity blocks will be described below with reference to FIGS. 1A and 1B. FIG. 1A is a plan view showing the resin-seal apparatus, and FIG. 1B is a sectional view showing a main part of the resin-seal apparatus. That is, as shown in FIGS. 1A and 1B, a pair of cavity blocks 2 and 3 for mounting molded bodies, i.e., resin-sealed semiconductor elements 1 (FIG. 1A), are sandwiched by chase bodies 4 and 5, and lower and upper ejector plates 6 and 7 are arranged to sandwich the chase bodies 4 and 5. In addition, a plurality of ejector pins 8 and a plurality of support pins 9 are arranged between the ejector plate 7 and the cavity block 2 and between the ejector plate 6 and the cavity block 3. The ejector pins 8 eject the molded bodies, and the support pins 9 apply a uniform clamping pressure on the semiconductor elements to be molded. In addition to elastic members 10, screws 11 and sleeves for preventing the chase bodies 4 and 5 and the ejector plates 6 and 7 from dropping are arranged between the chase bodies 4 and 5 and the ejector plates 6 and 7.

In the apparatus having the above arrangement, although the support pins are arranged for applying a uniform pressure on the cavity blocks, since the elastic members 10 for pushing up the ejector pins are arranged, it is difficult that the support pins are freely arranged with good balance. Therefore, a uniform pressure does not act on the cavity blocks, and resin leaks from the cavity to produce resin flashes. In addition, when the cavity blocks and the ejector pins are not easily operated due to contact therebetween, the resin-sealed semiconductor element cannot be pushed down to the lower cavity block by a force of the spring, and the resin-sealed semiconductor elements cannot be easily released from the cavity. Furthermore, when small-size cavity blocks are used, no uniform pressure acts on the cavity blocks. For this reason, the cavity blocks are deformed by a clamping pressure generated during the molding operation to cause the resin to leak from the cavity so as to produce resin flashes, and excellent molded bodies cannot be obtained. In addition, since the structure of the heat-plate molding die sets is complicated, a low-price and small-size apparatus cannot be obtained.

SUMMARY OF THE INVENTION

The present invention has been made in consideration of the above problem, and has as its object to provide a low-price and small-size resin-seal apparatus for a semiconductor element in which a uniform pressure can act on cavity blocks and a defective operation is not performed.

According to the present invention, there is provided a resin-seal apparatus of a semiconductor element comprising a pair of cavities and a pair of cavity blocks arranged to be opposite to each other and having a semiconductor element to be molded, upper and lower mold ejector plates arranged to correspond to the pair of cavity blocks, ejector pins and support pins arranged between the ejector plates and the cavity blocks, a pair of first annular heat-plate molding die sets arranged to surround the cavity blocks and the ejector plates, a second heat-plate molding die set arranged below a corresponding one of the ejector plates, a plate holder arranged below the second heat-plate molding die set, a gap portion and an elastic member formed between the plate holder and the second heat-plate molding die set, vertically movable connecting rods arranged through the gap portion and each having both ends respectively locked the corresponding one of the ejector plates and the plate holder to integrally vertically move the corresponding one (lower) of the ejector plate and the plate holder, stepped bolts mechanically engaged the connecting rods, respectively, and push-up rods for pushing up the stepped bolt.

According to the present invention, grooves are formed in the lower ejector plate, and connecting rods are arranged between the lower ejector plate and the plate holder for a heat-plate molding die set, thereby forcibly driving the connecting rods. An ejector pin returning spring which is to be arranged between the upper ejector plate and the upper cavity block can be omitted, a location of the ejector pin returning spring need not be taken into consideration, and the support pins can be freely arranged on the cavity block. Therefore, a uniform pressure can act on the cavity block. In addition, an ejector mechanism constituted by the lower ejector plate, the lower cavity block, the ejector pins, the support pins, and the plate holder can be arranged independently of other parts of the resin-seal apparatus, and the push-up rod are brought into direct contact with the ejector mechanism. The lower ejector plate and the plate holder are integrated with each other by the connecting rods mechanically mounted on the side surface of the lower ejector plate, and the lower ejector plate and the plate holder are vertically moved. Thus, the compact and low-cost resin-seal apparatus can be obtained.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 is a sectional view showing a resin-seal apparatus according to an embodiment of the present invention;

DETAILED DESCRIPTION OF THE PREFERRED EMBODIMENTS

Figure 1A:
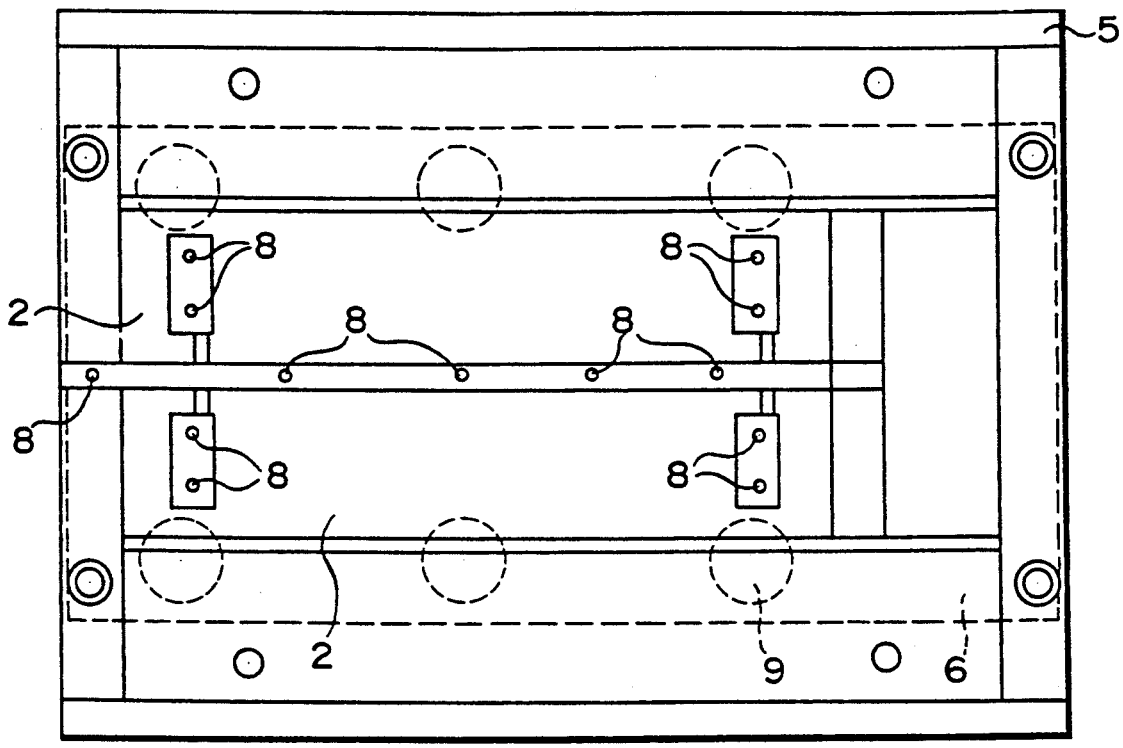
FIG. 1A is a plan view showing a conventional resin-seal apparatus for a semiconductor element.
Figure 1B:
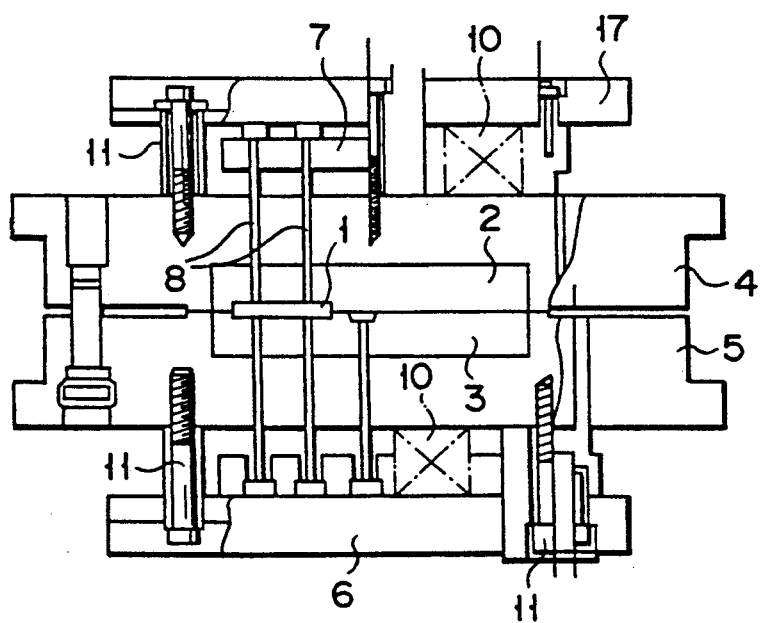
FIG. 1B is a sectional view showing a conventional resin-seal apparatus for a semiconductor element.
Figure 3A:
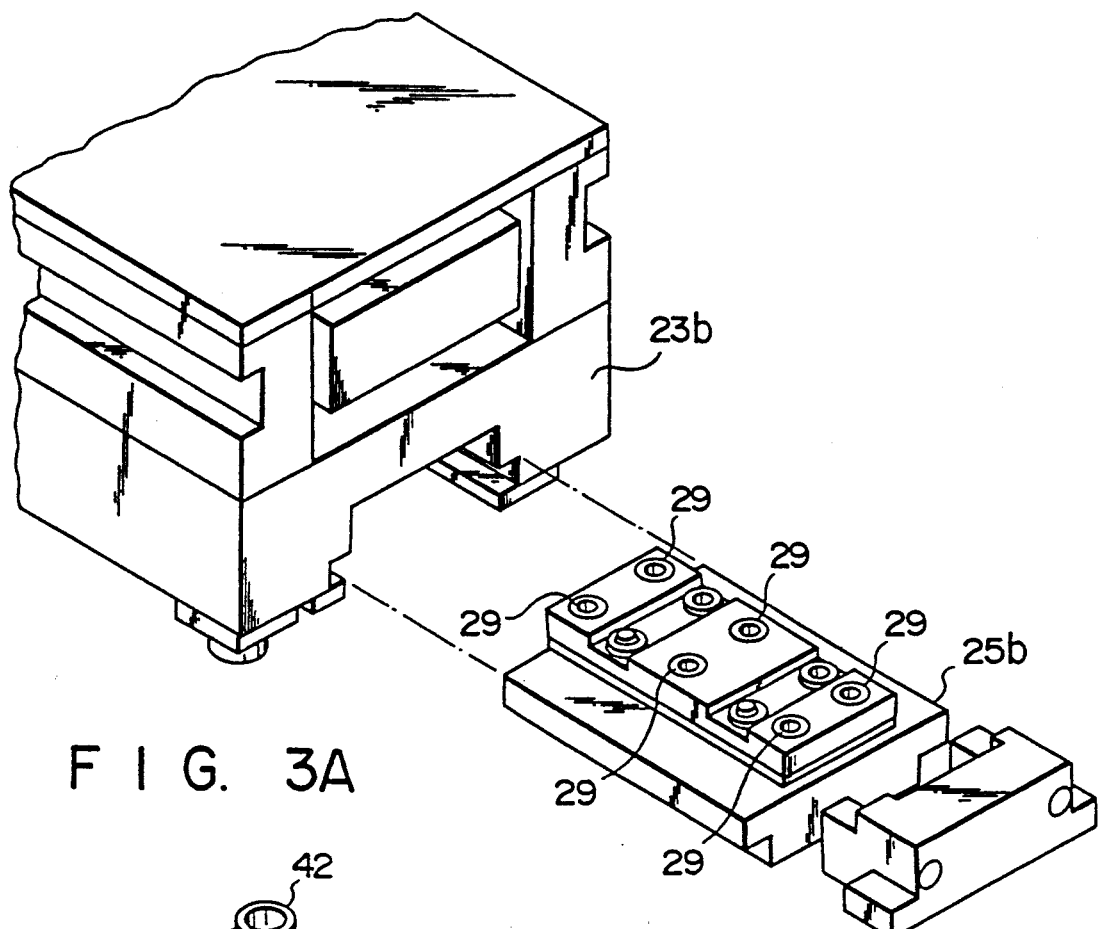
FIGS. 3A and 3B are perspective views showing a main part of the apparatus in FIG. 2.
Figure 3B:
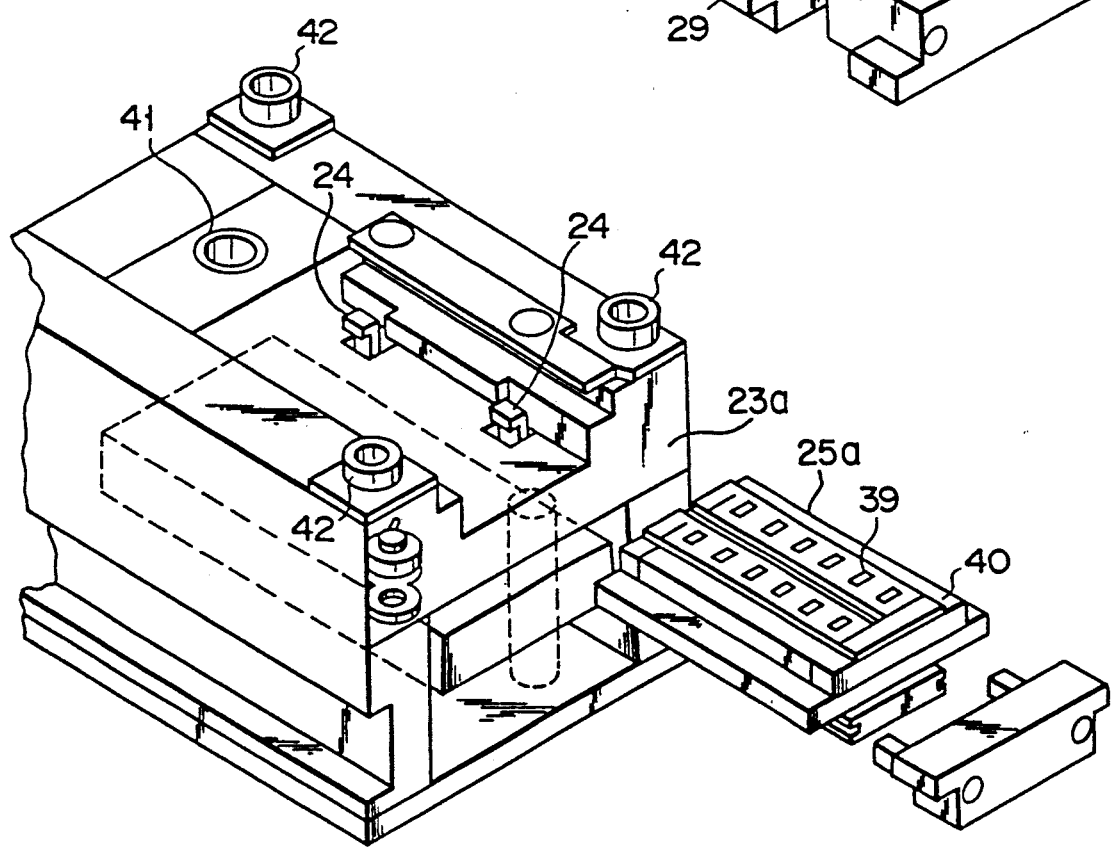
Figure 4:
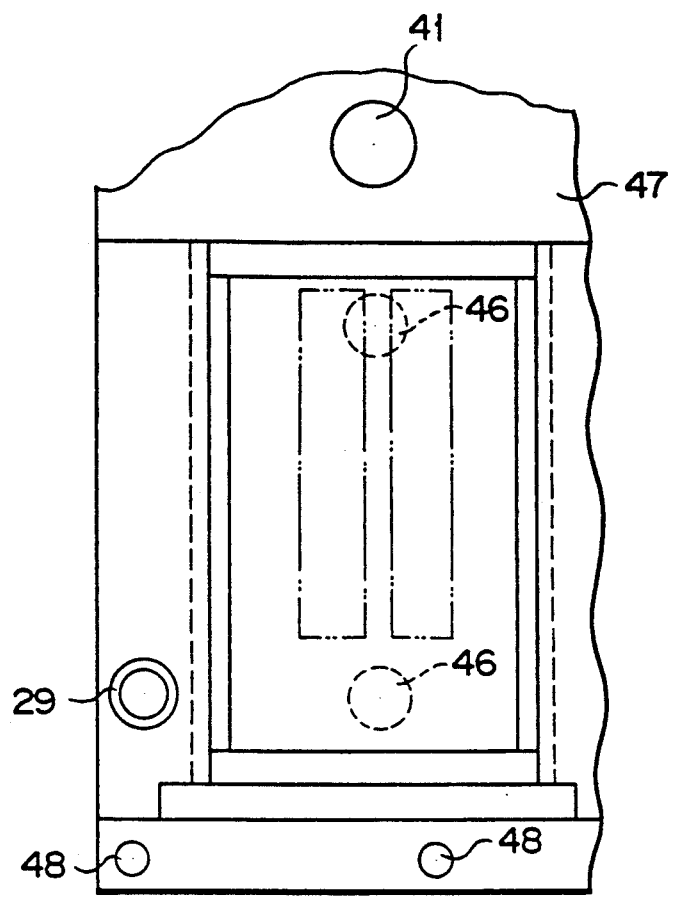
FIG. 4 is a plan view showing a resin-seal apparatus according to another embodiment of the present invention.
Figure 5:
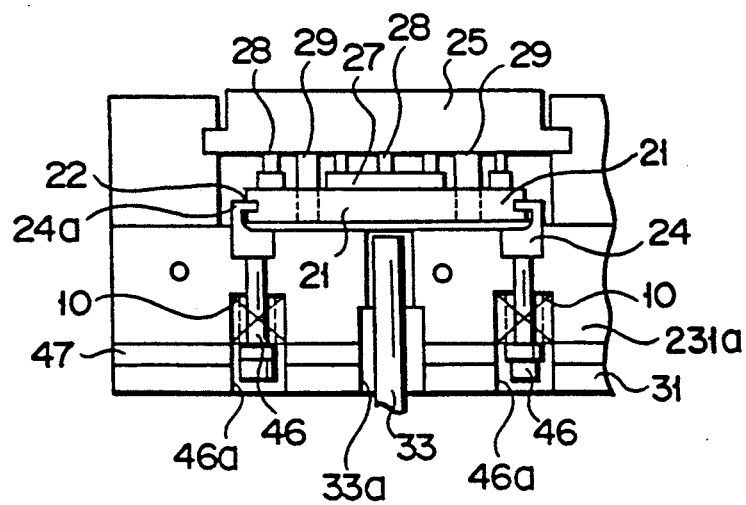
FIG. 5 is a sectional view showing a resin-seal apparatus shown in FIG. 4.

Embodiments according to the present invention will be described below with reference to FIGS. 2 to 5. FIGS. 2, 3A, and 3B show an embodiment of the present invention, and FIGS. 4 and 5 show other embodiments of the present invention.

In the embodiment shown in FIGS. 2, 3A and 3B, a lower ejector plate 21 is connected to a plate holder 30a with connecting rods 24. The lower ejector plate 21 and the plate holder 30a which are connected to each other by the connecting rods 24 are vertically moved together. That is, projecting portions 24a and 36 of the connecting rods 24 are fitted to annular grooves 22 formed in the side surfaces of the lower ejector plate 21 and grooves formed in the side surfaces of the plate holder 30a, respectively, so as to integrate the plate 21 and the plate holder 30a. A resin-seal apparatus for a semiconductor element having the above arrangement as this feature will be described below. As shown in FIG. 2, cavity blocks (not shown), are arranged in a pair of chase bodies 25a and 25b, and the lower ejector plate 21 and an upper ejector plate 26 are vertically arranged corresponding to the chase bodies 25a and 25b. Lower and upper ejector holders 27a and 27b are parallely arranged between the ejector plates 21 and 26, and a plurality of ejector pins 28 and a plurality of support pins 29 are vertically arranged between the ejector plates 21 and 26 and the cavity blocks (not shown).

An ejector mechanism is constituted by the lower and upper ejector plates 21 and 26, the lower and upper ejector holders 27a and 27b, the ejector pins 28, the support pins 29, the chase bodies 25a and 25b, and the cavity blocks. This ejector mechanism is surrounded b first upper and lower annular heat-plate molding die sets 23a and 23b and second upper and lower annular heat-plate molding die sets 231a and 231b, and semiconductor elements (not shown) to be molded which are arranged in the cavity are coated with a melted sealing resin. The above arrangement will be described later with reference to FIGS. 3A and 3B. The second lower heat-plate molding die set 231a is arranged to be adjacent to the lower ejector plate 21. The second lower heat-plate molding die set 231a is actually a part formed integrally with the first lower heat-plate molding die set 23a although the molding die set 231a is illustrated as a separate member.

A support block 30 and the plate holder 30a are arranged on the bottom portions of the first lower annular heat-plate molding die set 23a and the second lower heat-plate molding die set 231a, and a base plate 31 and a platen 32 are arranged therebelow to be adjacent to each other. Gap portions must be required to vertically move the connecting rods 24. As shown in FIG. 2, gap-portions are formed between the first lower heat-plate molding die set 23a and the second lower heat-plate molding die set 231a, between the support block 30 and the plate holder 30a, and between the plate holder 30a and the second heat-plate molding die set 231a so as to vertically move the connecting rods 24. In addition, the plate holder 30a is fitted to the projecting portions 36 formed at the lower ends of the connecting rods 24 to regulate the amount of movement of the connecting rods 24. In order to vertically move the connecting rods 24, push-up rods 33 (no drive source therefor is shown) brought into contact with the plate holder 30a are provided.

FIGS. 3A and 3B are perspective views showing a case wherein the chase bodies 25a and 25b are inserted into the above ejector mechanism. FIG. 3A shows a state wherein the upper chase body 25b is inserted into an exclusive unit, i.e., the upper heat-plate molding die set 23b. In FIG. 3A, in addition to the support pins 29, screws 37 for connecting the ejector plate 26 shown in FIG. 2 to the heat-plate molding die set 23a and a fixing block 38 for fixing the chase body 25b are arranged. In contrast to this, FIG. 3B shows a state wherein the lower chase body 25a is inserted into the lower heat-plate molding die set 23a. As shown in FIG. 3B, a molding die set 40 in which semiconductor elements 39 to be molded are arranged in the cavities and the lower ejector plate are inserted into the lower heat-plate molding die set 23b. The connecting rods 24, a pot 41, and guide posts 42 required for accurately arranging a pair of parts are shown in FIG. 3B.

In a semiconductor device resin-seal apparatus according to the present invention having the above arrangement, the resin-sealing operation will be performed as described below.

The lower and upper cavity blocks 25a and 25b are inserted into the lower and upper heat-plate molding die sets 231a and 231b, respectively, and the platen 32 is moved upward, thereby completing a clamping operation performed by the lower and upper chase bodies 25a and 25b. An upper push-up rod 44 is moved upward, and the lower ejector pins 28 are stopped at a predetermined state. A sealing resin is supplied to the resin-seal apparatus. A plunger (not shown) is actuated to supply the resin to the cavity, thereby completing a molding operation.

The platen 32 is moved downward, and the upper push-down rod 44 is moved downward to move the upper ejector pins 28 downward. Therefore, the semiconductor elements 39 to be molded which are resin-sealed are released from the upper cavity block 25b. When the platen 32 is moved downward to the bottom dead center, the lower ejector plate 21 is moved upward by the push-up rods 33. At this time, the semiconductor elements 39 to be molded which are resin-sealed are released from the lower chase body 25a.

The resin seal step which is briefly described above will be described below in detail.

Elastic members are arranged to the above molding mechanism for resin-sealing a semiconductor element at two portions. That is, in addition to elastic members 10, another support block 43, the push-down rods 44, and another ejector plate 45 on which the push-up rods 44 are mounted are arranged on the upper heat-plate molding die set 23a. Another elastic member (not shown) for each of the push-down rod 44 is arranged in a direction of the ejector plate 45.

This elastic member (not shown) acts such that the ejector plate 26 and the ejector pins 28 are always moved downward by the push-down rod 44, and the elastic member 10 acts such that the ejector plate 21 and the ejector pins 28 are moved downward. At this time, the ejector plate 21 and the ejector pins 28 are moved upward by the push-up rods 33 and the connecting rods 24 in advance.

The resin-sealed semiconductor elements serving as molded bodies to which the resin-sealing step is performed are released by the ejector pins 28. At this time, the push-up rods 33 and the connecting rods 24 are moved downward, thereby moving the ejector pins 28 downward.

The second embodiment of a resin-seal apparatus for a semiconductor element according to the present invention will be described below with reference to the accompanying drawings.

FIG. 4 is a plan view showing a resin-seal apparatus for a semiconductor element according to the present invention, and FIG. 5 is a sectional view showing the lower portion of the resin-seal apparatus. The sectional view of FIG. 5 shows only a portion near a lower molding body 25. In the second embodiment, unlike the first embodiment, no gap portion is arranged below (the lower direction of FIG. 5) a second heat-plate molding die set 231a. That is, an ejector plate 21 is arranged to be adjacent to the second heat-plate molding die set 231a, holes 33a and 46a are formed in the second heat-plate molding die set 231a, and connecting rods 24 and push-up rod 33 are arranged in the holes.

As in the first embodiment, projecting portions 24a formed at the ends of the connecting rods 24 are fitted to annular grooves 22 formed on the side surfaces of the ejector plate 21 constituting an erector mechanism, such that the ejector plate 21 is integrally moved with the connecting rods 24. In addition, push-up rods 46 exclusively used for the connecting rods 24 are arranged together with the holes 46a. However, elastic members 10 are arranged in the holes 46a, and the same function as in the first embodiment is obtained. A heat-insulating member 47 and a base 31 are continuously arranged on the second heat-plate molding die set 231a. In addition, as in the first embodiment, a platen (not shown) is arranged to be adjacent to the base 31. Although the elements of the ejector mechanism are briefly described in FIG. 5, as in FIG. 2, upper and lower erector mechanisms are arranged. Parts required for the resin-sealing step are arranged in the apparatus of the second embodiment, and a part of the apparatus is shown in FIG. 4. That is, a pot 41, a pot block 47, screws 48 for mounting the platen, and support pins 29 are shown in FIG. 4.

The size of the above molding body is 266 (length)×190 (width)×65 (a sum of the heights of the upper and lower mold bodies is 130 mm) mm. A lead frame for mounting the mold body has a length of 150 to 230 mm and a width of 26 to 70 mm.

According to the present invention, since a uniform pressure acts on cavity blocks because the number of support pins arranged on the cavity blocks is increased compared with that of a conventional apparatus, no resin is leaked from the cavity to prevent production of flash, thereby preventing a defective operation of the ejector pins. Therefore, productivity and workability of the apparatus can be improved. According to the second embodiment, in addition to the above effects, a compact, small-size, and low-price resin-seal apparatus can be obtained.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept a defined by the appended claims and their equivalents.

What is claimed is:

1. A resin-seal apparatus for a semiconductor element, comprising:
   at least two opposing cavity blocks for mounting a semiconductor element to be molded;
   at least two ejector plates corresponding to said cavity blocks, said at least two cavity blocks being interposed between said at least two ejector plates;
   an ejector pin and a support pin between said ejector plates and said cavity blocks;
   a pair of first heat-plate molding die sets arranged to surround said cavity blocks and said ejector plates;
   a second heat-plate molding die set below one of said ejector plates;
   a plate holder below said second heat-plate molding die set wherein a gap exists between said plate holder and said second heat-plate molding die set;
   an elastic member between said plate holder and said second heat-plate molding die set;
   a connecting rod movable in said gap, said connecting rod having one end connected to one of said ejector plates and the other end connected to said plate holder; and
   a push-up rod for pushing up said plate holder, wherein said cavity blocks are removably inserted into said first heat-plate molding die sets.

2. A resin-seal apparatus for a semiconductor element, comprising:
   at least two opposing cavity blocks for mounting a semiconductor element to be molded;
   at least two ejector plates corresponding to said cavity blocks, said at least two cavity blocks being interposed between said at least two ejector plates;
   an ejector pin and a support pin between said cavity blocks and said ejector plates;
   a pair of first heat-plate molding die sets arranged to surround said cavity blocks and said ejector plates;
   a second heat-plate molding die set below one of said first heat-plate molding die sets;
   a push up rod extending through said second heat-plate molding die set, for pushing up a corresponding one of said ejector plates; and
   a vertically movable connecting rod extending through said second heat-plate molding die set, said connecting rod having one end fitted to a corresponding one of said ejector plates;

wherein said cavity blocks are removably inserted into said first heat-plate molding die sets.

3. A resin-seal apparatus as claimed in claim 1, further comprising at least one additional ejector pin like the ejector pin, at least one additional support pin like the support pin and at least one additional connecting rod like the connecting rod.

4. A resin-seal apparatus as claimed in claim 3, wherein said pair of first heat-plate molding die sets are annular.

5. A resin-seal apparatus as claimed in claim 2, further comprising at least one additional ejector pin like the ejector pin, at least one additional support pin like the support pin and at least one additional connecting rod like the connecting rod.

6. A resin-seal apparatus as claimed in claim 5, wherein said pair of first heat-plate molding die sets are annular.

* * * * *